United States Patent [19]

Tippin

[11] 3,957,300

[45] May 18, 1976

[54] TIRE HANDLING DEVICE

[75] Inventor: Arthur David Tippin, Tamworth, England

[73] Assignee: Dunlop Limited, London, England

[22] Filed: July 2, 1974

[21] Appl. No.: 485,168

[30] Foreign Application Priority Data

July 12, 1973 United Kingdom............... 33222/73

[52] U.S. Cl................................. 294/97; 214/330
[51] Int. Cl.² ........................................... B66C 1/00
[58] Field of Search ........................... 214/330–334; 294/90, 93, 95, 97; 425/3, 38, 29

[56] References Cited

UNITED STATES PATENTS

| 2,422,848 | 6/1947 | Peters.................................. | 294/97 |
| 3,380,115 | 4/1968 | Soderquist........................... | 425/38 |
| 3,471,895 | 10/1969 | Ulm et al............................ | 425/38 |
| 3,564,649 | 2/1971 | Soderquist........................... | 425/29 |
| 3,845,979 | 11/1974 | Schatz et al. ...................... | 294/97 |

FOREIGN PATENTS OR APPLICATIONS

| 935,888 | 9/1963 | United Kingdom................... | 294/97 |
| 128,684 | 6/1919 | United Kingdom | |
| 274,221 | 7/1927 | United Kingdom | |
| 377,471 | 7/1932 | United Kingdom | |
| 865,447 | 4/1961 | United Kingdom | |
| 935,888 | 9/1963 | United Kingdom | |

Primary Examiner—Albert J. Makay
Assistant Examiner—Lawrence J. Oresky
Attorney, Agent, or Firm—Stevens, Davis, Miller & Mosher

[57] ABSTRACT

A ring of paddles is provided the lower ends of which are engageable under the upper bead of a longitudinally-lying tire for lifting the latter and positioning it in a press. The paddles define an enclosure for the press diaphragm to prevent the latter "ballooning" out above a tire or tire carcass pre-formed to C-section and thus of smaller axial extent than its diaphragm when inserted in the press. Spreading of the lower ends of the paddles to engage under the tire bead is effected by gravity as the device is lifted and locking means is provided to prevent such spreading when desired.

6 Claims, 4 Drawing Figures

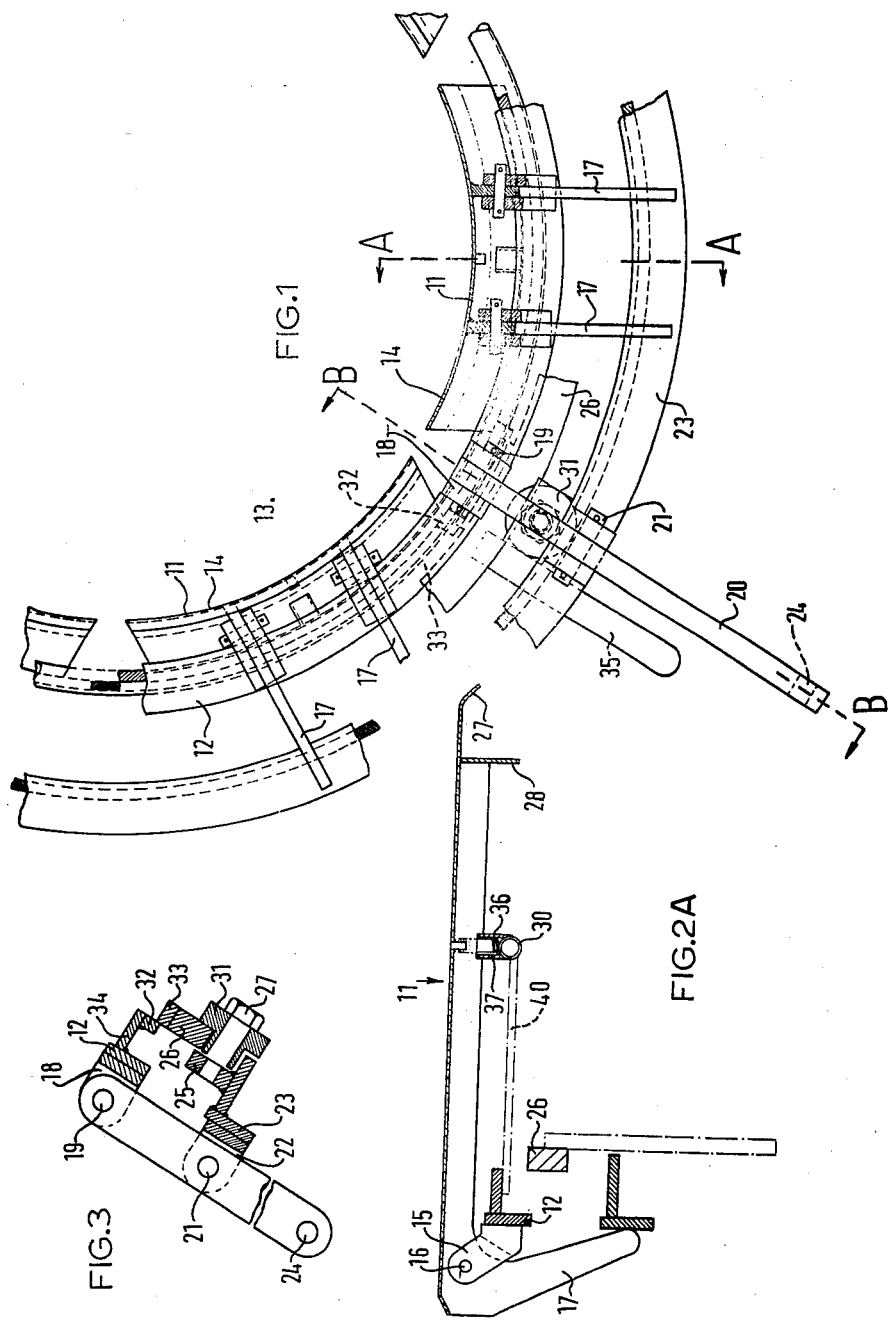

TIRE HANDLING DEVICE

This invention relates to a tire handling device. In one preferred use the invention provides a device for lifting a tire or preformed tire carcass, positioning the same in relation to a diaphragm and preventing expansion of an upper part of the diaphragm outside the tire or tire carcass.

An object of the invention is to provide an improved tire handling device suitable for transporting tires and tire carcasses between different locations.

In the production of certain kinds of tires and in remoulding processes it is necessary to subject to moulding or curing treatments a tire or tire carcass which has already been formed approximately to the final, toroidal shape. In this shape, the axial length of the tire or carcass is considerably less than that of a cylindrical diaphragm suitable, on inflation, to fill it. The problem therefore arises that in attempting to fit a diaphragm into a preferred tire or tire carcass the diaphragm will tend to balloon out in the regions axially outside the tire or tire carcass instead of properly filling the latter.

It has therefore been a common practice to use, instead of the diaphragm, a toroidal "curing bag" which is first fully inserted into the tire or carcass and then inflated. This, the so-called "bag-moulding" process is, however, considerably more expensive, time-consuming and difficult.

It is therefore another object of the present invention to enable a curing diaphragm to be used in connection with a preformed, toroidal tire or tire carcass.

According to the invention there is provided a tyre handling device comprising a plurality of paddle members pivotally connected near to one of the respective ends thereof to a common, annular mounting so that when the mounting is horizontal the paddle members depending from it will jointly form an open-ended, generally cylindrical enclosure, and suspension means for the device adapted to engage each said paddle member, when the device is lifted by said suspension means, whereby the other ends of the paddle members tend to move radially outwardly of the enclosure under the action of gravity.

The suspension means is preferably adapted to engage each paddle member at a position offset radially outwardly of the enclosure from the pivotal connection of said paddle member to the annular mounting.

Each said paddle member may be formed in the region of its said one end with an arm extending radially outwardly of the enclosure and the common mounting may be an inner ring which is pivotally connected to each paddle member at a point on the latter near the root end of its arm. The suspension means may comprise an outer ring connected by suitable linkage means to the inner ring for relative axial movement, thereby to engage the free end of the arm of each paddle member when the device is lifted. Said linkage means may include a plurality of links each pivotally connected at one of its ends to the inner ring in circumferentially-spaced relation, the links being pivotally connected intermediate their ends to the outer ring and having free end portions extending radially beyond the outer ring for engagement by means for lifting the device.

A preferred embodiment of the invention will now be described with reference to the accompanying drawings, in which:

FIG. 1 is a plan view partly in cross-section of part of a device in accordance with the invention;

FIG. 2A is a cross-section taken on the line A—A of FIG. 1,

FIG. 3 is a cross-section taken on the line B—B of FIG. 1.

Figure 2B:
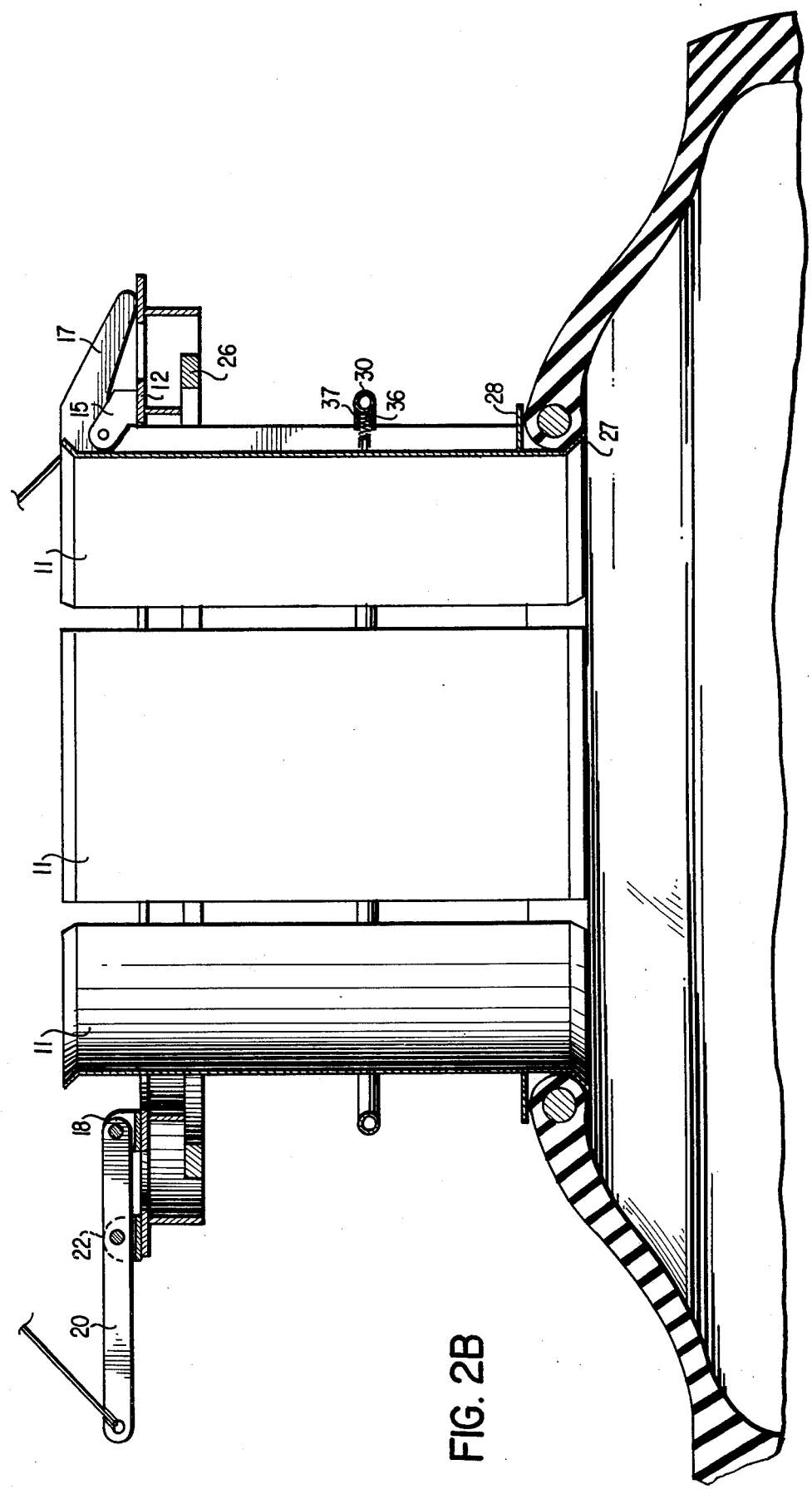
FIG. 2B is a cross-section of the device showing it gripping a tire.

The device illustrated in FIG. 1 comprises a plurality of paddles 11 all pivotally connected to an inner ring 12 so as jointly to form an open-ended, generally cylindrical enclosure 13. Each paddle 11 comprises a plate 14 which, as can be seen in FIG. 1, is arcuate in cross-section so that the faces of the plates 14 represented inwardly of the enclosure 13 all lie generally on a common cylinder when all of the paddles 11 are vertical.

Each paddle 11 is formed with a pair of laterally spaced, parallel arms 17 near to its upper end and forming with the plate 14 the shorter leg of an inverted L extending from the outer face of the plate 14 radially outwardly of the enclosure 13. Pivotal connection of each paddle 11 to the inner ring 12 is by means of pairs of lugs 15 welded to the inner ring 12, each of which is pivotally connected at 16 to the root end of an arm 17.

Also welded to the inner ring 12 between adjacent pairs of paddles 11 are lugs 18 (only one of which is shown) to which are pivotally connected at 19 the radially inner end of a respective link 20. Intermediate its ends the link 20 is pivotally connected at 21 to a lug 22 welded to an outer ring 23 of greater diameter than the ring 12. The free end of the link 20 is apertured at 24 for the attachment of a chain so that when chains are attached to all of the links 20 (the optimum number of links and chains being three equally circumferentially spaced) the device 10 may be lifted by a crane hook.

Spaced circumferentially around the outer ring 23 on its radially inner side are flanges 25 beneath each of which a roller 31 is rotatably mounted by means of bearing bolts 27 so as to have an axis of rotation parallel with the axis of the ring 23.

An intermediate ring 26 rests on the rollers 31 and this has circumferentially spaced projections 33 on its inner periphery which, in the positions illustrated in FIGS. 1 and 3, engage under circumferentially spaced projections 32 extending radially outwardly from a flange 34 beneath the inner ring 12. In this position abutment between the projections 32 and 33 prevents the outer ring 23 raising in relation to the inner ring 12. However, the intermediate ring 26 is rotatable on the rollers 31 relative to the inner ring 12 by angularly moving a handle 35 welded to the ring 26 until the projections 32 and 33 are no longer aligned, whereupon the outer ring 23 is free to move upward relative to the inner ring 12 until further movement of arms 17 causes paddles 11 to come to rest against either tubes 36, which are held by a restraining ring 30, or the inside of a tire bead.

Intermediate their ends the paddles 11 are surrounded by the ring 30 which has a radially inwardly extending tubular housing 36 aligned with each paddle 11. A compression spring 37 is located in each housing 36 and acts against the respective paddle 11, biassing it inwardly of the enclosure 13. The ring 30 is held in position by struts 40 extending from the inner ring 12.

The bottom end of the plate 14 of each paddle 11 is bent outwardly of the enclosure 13 at 27 to locate under the uppermost bead of a horizontally-lying tire or tire carcass while a flange 28 rests on top of the tire or carcass.

In use the device 10 is raised by a crane, individual chains (FIG. 2B) passing from the crane hook to the free end of each link 20, the intermediate ring 26 being in the angular position of FIGS. 1 and 3 so that the outer ring 23 does not rise relative to the inner ring 12 from the position of FIG. 3 and all the paddles 11 are held by the springs 37 with their plates 14 substantially vertical.

The device 10 is lowered by the crane until the lower ends of the paddles 11 enter the central space of a toroidal tire or tire carcass, the flanges 28 coming to rest on top of the uppermost bead of the horizontally-lying tire or carcass. The handle 35 is now operated angularly to move the intermediate ring 26 until the projections 33 thereof clear the projections 32 of the inner ring this being possible because the weight of the paddles and inner ring is supported by the flanges 28 of the paddles resting on the tire bead. When the device is now raised by the crane hook the weight of the paddles 11 and ring 12 causes the outer ring 23 to be lifted relative to the inner ring 12 thereby swinging the paddles 11 about their pivots 16 against the action of the springs 37 so that the lower end of each paddle engages the upper bead of the tire or carcass, the portion 27 of each paddle locating beneath the bead.

On continued lifting of the device 10 by the crane the weight of the tire or carcass adds to the forces tending to displace the outer ring 23 axially relative to the ring 12, whereby reaction forces at the bottom ends of the paddles 11 cause firm engagement of the tire or carcass by the paddles.

The tire or carcass held by the device 10 suspended frm the crane hook is lowered over a vertically disposed curing diaphragm, (the latter having, in its uninflated state, a height considerably in excess of the axial length of the tire or carcass), until the tire or carcass surrounds the lower portion of the diaphragm, its upper portion being surrounded by the paddles 11.

When the diaphragm is now inflated the plates 14 of the paddles 11 prevent the portion of the diaphragm above the tire or carcass from "ballooning" out over the latter. Instead the diaphragm is contrained properly to enter and fill the suspended tire or carcass as the top of the diaphragm is lowered to the level of the upper tire bead.

Furthermore, during this operation the weight of the tire or carcass tends to separate its beads as it is suspended only by its upper one, thus facilitating entry of the diaphragm.

The device 10 can be separated from the tire or carcass by lowering the latter onto a supporting surface. As soon as the flanges 28 take the weight of the paddles 11 and inner ring 12 the outer ring 23 moves downwardly relative to ring 12, the links 20 pivoting at 19, until the intermediate ring 26 is once more below the projections 32. The handle 35 is now operated to move the intermediate ring 26 back to the position of FIGS. 1 and 3 and the device 10 again raised by the crane. As soon as frictional contact between the flanges 28 and the upper tire bead is thus broken the paddles 11 are urged inwardly of the enclosure 13 by the springs 37 until the free ends of the arms 17 contact the outer ring 23. In this position the projections 27 of the paddles will clear the upper bead of the tire as the device 10 is lifted away from it by the crane.

Having now described my invention, what I claim is:

1. A tire handling device comprising:
    a plurality of paddle members,
    an annular mounting to which the paddle members are pivotally connected near to one of the respective ends thereof so that when the mounting is horizontal the paddle members depending from it will jointly form an open-ended, generally cylindrical enclosure,
    each of said paddle members comprises, adjacent said one end, an arm extending radially outwardly of the enclosure,
    the annular mounting comprises a ring which is pivotally connected to each paddle member at a point thereon near the root of its arm,
    suspension means for the device adapted to engage each said paddle member at a position offset radially outwardly of the enclosure from the pivotal connection of each of the paddle members to the annular mounting when the device is lifted by said suspension means whereby the other ends of the paddle members tend to move radially outwardly of the enclosure under the action of gravity, and the suspension means comprises a second outer ring connected by suitable linkage means to the first-mentioned ring for relative axial movement, thereby to engage the free end of the arm of each paddle member when the device is lifted.

2. A device as claimed in claim 1 wherein each paddle member is arcuate in cross-section so that the faces of said members presented inwardly of the enclosure all lie generally on a common cylinder when all the paddle members are vertical.

3. A device as claimed in claim 1 wherein the said linkage means includes a plurality of links each pivotally connected at one of its ends to the first-mentioned ring in circumferentially-spaced relation, the links being pivotally connected intermediate their ends to the outer ring and having free end portions extending radially beyond the outer ring for engagement by means for lifting the device.

4. A device as claimed in claim 1 wherein an intermediate locking ring is interposed between the first-mentioned and outer rings and is rotatable relative thereto between a locking position in which the intermediate ring will interpose between the first-mentioned and outer rings to prevent upward movement of the outer ring relative to the first-mentioned ring and an unlocked position in which the intermediate ring is free to move through at least one of said first-mentioned and outer rings whereby upward movement of the outer ring relative to the first-mentioned ring is not prevented by the intermediate ring.

5. A device as claimed in claim 4 wherein the intermediate ring is mounted for rotation relative to the outer ring on rollers rotatably secured to the outer ring, the intermediate ring and first-mentioned ring having flanges which are aligned axially of the rings in the locking position of the intermediate ring and which are circumferentially spaced apart in the unlocked position of the intermediate ring.

6. A device as claimed in claim 1 wherein a spring is provided to act on each paddle member to bias the paddle inwardly of the enclosure.

* * * * *